UNITED STATES PATENT OFFICE.

MANUEL PRADO P., OF SANTIAGO, CHILE.

COMPOSITION FOR MATCHES AND PROCESS FOR MAKING SAME.

1,387,999.     Specification of Letters Patent.     Patented Aug. 16, 1921.

No Drawing.     Application filed December 19, 1919. Serial No. 346,111.

*To all whom it may concern:*

Be it known that I, MANUEL PRADO P., a citizen of the Republic of Chile, and a resident of Santiago, Chile, have invented a new and Improved Composition for Matches and Process for Making Same, of which the following is a full, clear, and exact description.

This invention relates to inflammable compositions and has reference more particularly to a composition for use in the manufacture of matches.

An object of this invention is to provide a paste for matches which will have a low specific gravity.

Another object of this invention is to provide a composition for matches which contains a minimum of potassium chlorate.

A further object of this invention is to provide a composition for the manufacture of matches which will contain such reactive materials as saw dust, coke, etc., which have a low specific gravity and are highly inflammable.

A still further object of this invention is to provide a composition of the class described which contains a substance which will prevent the natural decomposition of potassium chlorate.

My improved composition consists of a mixture of potassium chlorate with two other compositions which I will designate as A and B. The composition A contains the following ingredients in the proportions named:

| | |
|---|---:|
| Strong glue | 15,500 |
| Wood sawdust | 42,500 |
| Flowers of sulfur | 8,650 |
| Powdered coal cinders | 3,250 |
| Gluten | 4,250 |
| Black antimony sulfid | 875 |
| Calcium hydroxid | 3,750 |
| Wood charcoal | 2,200 |
| Coke | 8,500 |
| Brick powder | 11,750 |

The gluten mentioned above is extracted from bran mash and dried. The composition is compounded by dissolving the glue in water at 40° C., and the other ingredients are then added in any order while the mixture is being thoroughly stirred by any suitable means. The mixture is then pressed into tablets which will be firm and somewhat hard when cool. These tablets are dried at 50° C. and are then ground, taking care not to make the powder too fine.

The composition B contains the following ingredients in the proportions named:

| | |
|---|---:|
| Coke | 24,000 |
| Black antimony sulfid | 4,500 |
| Powdered glass | 20,500 |
| Brick powder | 32,000 |
| Potassium dichromate | 19,000 |

The composition B is compounded by mixing the ingredients in any order together with a little water until a paste is formed. This paste is dried and when dry is pulverized taking care that the powder is not too fine. The final composition consists of the following ingredients in the proportions named:

| | |
|---|---:|
| Water | 58,000 |
| Potassium chlorate | 22,000 |
| Composition A | 17,000 |
| Composition B | 2,000 to 3,000 | according to the climate and the speed of inflammation desired in the matches.

This final composition is compounded by putting three-quarters of the quantity of water mentioned above in a suitable container, adding the quantity of potassium chlorate and mixing the same until the water is completely saturated with the potassium chlorate. The composition A is then added and the mixture again thoroughly stirred until a semi-plastic paste is obtained which is allowed to stand for eight or ten hours. After standing, the paste is put in any suitable grinding machine where it is thoroughly ground and mixed at the same time, while the remaining water in the above formula is added. After being allowed to stand for a short time, the composition B is added and is well mixed. After this mixture is allowed to stand a few minutes, it is ready for use. It is understood that all the above mentioned formulas are spoken of in parts by weight. In order to obtain a composition that lights the matches by friction, to each one hundred parts of the above mixture is added four parts of powdered glass, and one and one-quarter parts of amorphous phosphorus which is intimately mixed with the aforementioned mixture by passing it several times through the grinding mill. If it is desired to make so-called safety matches, the phosphorus may be omitted from the composition and applied instead to the match container with a suitable adhesive such as glue.

In the manufacture of ordinary matches, it has been the practice to use as high as 60% potassium chlorate in the inflammable composition, and I have been able to reduce this percentage to about 18% as seen in the above formulas, so that the cost of manufacture has been greatly reduced. Also in the preparation of ordinary matches it has been the practice to use as high as 20% glue as a binder, while in my composition less than 2.5% is used. Glue is non-inflammable and by reducing its proportions in the composition, less oxidizing agents such as potassium chlorate and potassium dichromate are necessary. As all kinds of glue are very hygroscopic, and since the absorption of moisture is one of the principal causes of the decomposition of potassium chlorate, the use of a very small quantity of glue will decrease the absorption of moisture by the matches and therefore the decomposition of the chlorate.

The gluten used in the composition is an adhesive which increases the adhesive power of the glue, and is not incombustible, so that it would not require a large amount of oxidizing agents such as potassium chlorate in order to burn it when the match is lighted, as glue would. It is also non-putrescible and is less hygroscopic than glue, so that it will cause less decomposition of the potassium chlorate due to the absorption of moisture. The coke, charcoal, and wood dust present in the composition gives the composition a certain porosity, and gives it a low specific gravity. These ingredients also act as powerful reducing agents, which react with the oxidizing agents to make a highly inflammable combination when the match is rubbed over a surface. While the potassium dichromate used in composition B is a strong oxidizing agent, it is not sufficiently strong to cause the combustion of the composition B without the presence of potassium chlorate. Thus compositions A and B may be stored separately until ready for use without running a big fire risk as neither composition is inflammable. Another advantage in keeping A and B separate is in the fact that the inert components of composition B such as glass, cinders, and brick powder, are not ground fine when composition A is being ground, and will therefore present a rougher surface when the match is rubbed, thus causing greater friction and an easier striking of the match. The antimony sulfid and the flowers of sulfur react with the oxidizing agents present in the composition and make the composition highly inflammable when the match is rubbed on a surface and ignited by the phosphorous. It is known that acids present as impurities in explosives, cause their quick combustion or explosion and an alkali such as calcium hydroxid is included in the match composition to neutralize the organic acids present in the wood sawdust and so regulate the speed of combustion of the match that its combustion will take place slowly and without explosive violence. The calcium hydroxid also serves as an inert material which will reduce the speed of combustion of the match.

I would state in conclusion that while the example described constitutes a practical embodiment of my invention, I do not limit myself strictly to the details herein described, since manifestly the same can be considerably varied without departure from the spirit of the invention as defined in the appended claims.

Having thus described my invention, I claim as new and desire to secure by Letters Patent:

1. A complete composition of matter for match heads, capable of igniting by friction, including a slight excess of alkaline material so that there will be no free acid present.

2. A complete composition of matter for match heads capable of igniting by friction, including a slight excess of calcium hydroxid so that there will be no free acid present.

3. A composition of matter for the manufacture of match heads, which contains oxidizing agents, gluten and other binding agents, antimony sulfid, reducing agents, inert materials and abrasing materials.

4. A composition of matter for the manufacture of match heads, which contains oxidizing agents, gluten and other binding agents, antimony sulfid, reducing agents, inert materials, abrasive materials, and wood sawdust.

5. A composition of matter for the manufacture of match heads, which contains oxidizing agents, reducing agents, gluten and other binding agents, antimony sulfid, inert materials, abrasive materials, wood sawdust, and an alkaline substance adapted to neutralize any acids contained in said composition.

6. A composition of matter for the manufacture of match heads, which contains oxidizing agents, reducing agents, gluten and other binding agents, antimony sulfid, inert materials, abrasive materials, wood sawdust, an alkaline substance adapted to neutralize any acids contained in said composition, and phosphorus.

7. A composition of matter for match heads, comprising glue, wood saw dust, flowers of sulfur, coal cinders, gluten, antimony sulfid, calcium hydroxid, wood charcoal, coke, brick powder, powdered glass, potassium dichromate and potassium chlorate.

MANUEL PRADO P.